United States Patent [19]

Shaffer et al.

[11] Patent Number: 4,941,088
[45] Date of Patent: Jul. 10, 1990

[54] SPLIT BUS MULTIPROCESSING SYSTEM WITH DATA TRANSFER BETWEEN MAIN MEMORY AND CACHES USING INTERLEAVING OF SUB-OPERATIONS ON SUB-BUSSES

[75] Inventors: Stephen J. Shaffer, Harvard, Mass.; Richard A. Warren, Austin, Tex.; Thomas W. Eggers, Littleton; William D. Strecker, Harvard, both of Mass.

[73] Assignee: Digital Equipment Corporation, Maynard, Mass.

[21] Appl. No.: 698,399

[22] Filed: Feb. 5, 1985

[51] Int. Cl.[5] ............... G06F 13/16; G06F 13/38; G06F 12/00

[52] U.S. Cl. .................. 364/200; 364/240.2; 364/243.43; 364/243.44

[58] Field of Search ... 364/200 MS File, 900 MS File

[56] References Cited

U.S. PATENT DOCUMENTS

| | | | |
|---|---|---|---|
| 4,392,200 | 7/1983 | Arulpragasam et al. | 364/200 |
| 4,424,572 | 1/1984 | Lorig et al. | 364/900 |
| 4,425,615 | 1/1984 | Swenson et al. | 364/200 |
| 4,433,375 | 2/1984 | Vinot | 364/200 |
| 4,445,172 | 4/1984 | Peters et al. | 364/200 |
| 4,449,183 | 5/1984 | Flahive | 364/200 |
| 4,604,743 | 8/1986 | Alexandru | 370/89 |
| 4,695,943 | 9/1987 | Keeley et al. | 364/200 |

Primary Examiner—Archie E. Williams, Jr.
Assistant Examiner—Ayni Mohamed
Attorney, Agent, or Firm—William W. Holloway; John M. Gunther

[57] ABSTRACT

In a data processing system in which a plurality of data processing units, as well as the main memory unit, are coupled to a system bus, the utilization of the system bus can be increased to such an extent that each of a plurality of cache memory units coupled to the system bus can have a plurality of data processing units coupled thereto. The system bus utilization is increased by dividing the system bus access operation into a plurality of sub-operations and by providing a defined cyclic sequence for the cache memory units to have access to the system bus. The system bus is divided into a plurality of sub-bus units to handle separate functions of data transfer. The main memory unit has apparatus for efficient execution of the write-modify-read operation. In addition, the cache memory units can be divided in a plurality of sub-units and the access to the system bus arranged in terms of cyclic access of the cache memory subunits.

8 Claims, 6 Drawing Sheets

ADDRESS BUS SIGNAL GROUP (DPU = DATA PROCESSING UNIT)
(CMS = CACHE MEMORY UNIT SUBSYSTEM)

SPLIT BUS MULTIPROCESSING SYSTEM WITH DATA TRANSFER BETWEEN MAIN MEMORY AND CACHES USING INTERLEAVING OF SUB-OPERATIONS ON SUB-BUSSES

RELATED APPLICATIONS

Apparatus and Method for Data Copy Consistency in a Multi-Cache Data Processing Unit invented by Stephen J. Shaffer and Richard A. Warren, Ser. No. 06/698,364, filed on Feb. 5, 1985 and assigned to the assignee named herein.

Apparatus and Method for Prohibiting Access in a Multi-Cache Data Processing System to Data Signal Groups being Manipulated by a Data Processing System invented by Thomas W. Eggers, Stephen J. Shaffer and Richard A. Warren, Ser. No. 06/698,366, filed Feb. 5, 1985 and assigned to the assignee named herein.

BACKGROUND OF THE INVENTION

1. Field of the Invention

This invention relates generally to data processing systems and, more particularly, to data processing systems having a plurality of data processing units. Data processing systems with more than one data processing unit can have the performance of the system limited by the ability of the data processing units to communicate with other portions of the data processing system over a data processing system bus.

2. Discussion of the Related Art

In data processing systems having a plurality of data processing units, a principal limitation in performance can be the capability of the system components to communicate within the system, especially when the principal communication path is a system bus. For example, data signal groups required by the individual data processing units must be extracted from the main memory unit and transferred to the requesting data processing unit. The system bus eliminates a multiplicity of signal paths coupling the main memory with each data processing unit, but can result in conflict in demand for access to the system bus by the data processing unit.

In data processing systems, the greatest limitation has generally been considered the speed with which the data processing unit can execute instructions. So crucial has this capability been viewed that to describe this feature, an expression, MIPS (i.e. millions of instructions per second), has been developed to describe a figure of merit for a data processing system. A multiplicity of techniques have been developed to improve performance of the individual data processing unit. Among those techniques are: implementation of the cache memory technique to attempt to ensure requested data signal groups are immediately accessible by the data processing system; implementation of the pipelining technique, which is a technique for dividing instruction execution operations requiring a given time interval into a plurality of component sub-instruction steps, each sub-instruction step requiring a smaller time sub-interval for execution so that the completion of an instruction can occur after each sub-interval; look-ahead techniques to insure to the extent possible that, for a sequence of instructions involving a branch instruction, both the sequence and the branch instruction are available to the data processing unit; etc. In addition, technology improvements such as reduced gate delays and increased gate density (which can reduce media propagation delays) can also be employed.

Another technique that has been employed to increase the execution ability of a data processing system is accomplished through the use of multiple data processing units. Several system architectures have been used to integrate the operation of a plurality of data processing units. One architecture includes a plurality of interface units, typically entitled system interface units, that are coupled to the data processing unit. These interface units can issue requests for data, can invalidate data and can perform a plurality of procedural and overhead functions permitting the associated data processing unit(s) to concentrate on instruction execution. The interface units typically require a large amount of logical apparatus to perform the needed procedural functions. None-the-less, because data processing units have become so effective for the reasons described above, the ability of data processing system to distribute data to the data processing units or to receive data from the data processing units has become, in many data processing systems, the limiting factor bounding the speed of the data processing system to execute programs.

A need has therefore been felt for apparatus and method for providing a plurality of data processing units in a data processing system that do not require elaborate interface apparatus to incorporate data processing unit into the data processing system. Furthermore, a need has been felt for a data processing system in which the ability to distribute data signal groups to the individual data processing units does not limit the performance of the data processing system.

SUMMARY OF THE INVENTION

It is therefore an object of the present invention to provide an improved data processing system.

It is another object of the present invention to provide an improved data processing system having a plurality of data processing units.

It is yet another object of the present invention to provide improved performance of a multi-processing unit data processing system utilizing a system bus.

It is a particular object of the present invention to provide an improved system bus implementation for use with a data processing system.

It is another more particular object of the present invention to provide an improved data processing system in which a plurality of data processing units can store a given data signal group.

It is another particular object of the present invention to provide, in a data processing system, a system bus for which an access operation is divided into a plurality of sub-operations.

It is yet another particular object of the present invention to provide a system bus in which access to the system bus by the plurality of data processing units utilizes multiplexing techniques.

It is a further object of the present invention to provide a system bus in which access to the system bus is multiplexed with respect to a plurality of address signal sub-groups related to each data processing unit's cache memory unit.

It is still another object of the present invention to provide a data processing system having a plurality of cache memory units coupled to the system bus, wherein each cache memory unit can have a plurality of data processing units coupled thereto.

It is a particular object of the present invention to provide a data processing system in which a system bus utilizes both multiplexing and pipelining techniques.

It is still another particular object of the present invention to provide a data processing system for which access to a system bus by data processing and units uses multiplexing and pipelining techniques, and wherein a plurality of cache memory units are coupled to the system bus and capable of having a plurality of data processing units coupled to each cache memory unit.

These and other objects are accomplished, according to the present invention, by a data processing system in which a plurality of data processing units are coupled to a system bus. Operations of the data processing system involving the system bus are divided into a plurality of sub-operations, each sub-operation requiring a smaller time interval then the complete operation involving the system bus. The technique, sometimes referred to as a pipelining technique, is distinguished from the usual sub-operation implementation in that the sub-operations do not necessarily occur in consecutive time intervals. This implementation is especially important in certain operations involving the main memory in which waiting for completion execution of an operation can result in a period of prolonged inactivity for the system bus. In addition, the time intervals for access to the system bus by each data processing unit can be defined by the data processing system to occur periodically, sometimes referred to as multiplexing the data processing units (in the time domain), or according to predetermined scheduling procedures. The main memory unit is provided with apparatus to support the sub-operations and periodic access by logic circuits for executing the "modify" instruction (i.e. the data signal contents of a main memory address) in an efficient manner. Similarly, the system bus includes separate sub-bus systems for the address signal groups, the data signal groups and the control signal groups. In addition, the data signal group sub-bus is further divided into a read data signal group sub-bus and a write data signal group sub-bus. The address signal groups are divided into a plurality of sub-address signal groups. The multiplicity of the data processing units can be indexed by the sub-address signal groups in addition to the indexing the cache memory units. The cache memory units support the sub-address groups by providing a plurality of cache memory sub-units, each cache memory sub-unit storing the associated sub-address signal groups. The system bus can provide, because, of the features of the cache memory unit, a process for the distribution of data signal groups that is sufficiently efficient to permit each cache memory unit to be coupled to a plurality of data processing units.

These and other features of the present invention will be understood by reading of the following description along with the drawings.

DESCRIPTION OF THE PREFERRED EMBODIMENT

Detailed Description of the Drawings

Figure 1:
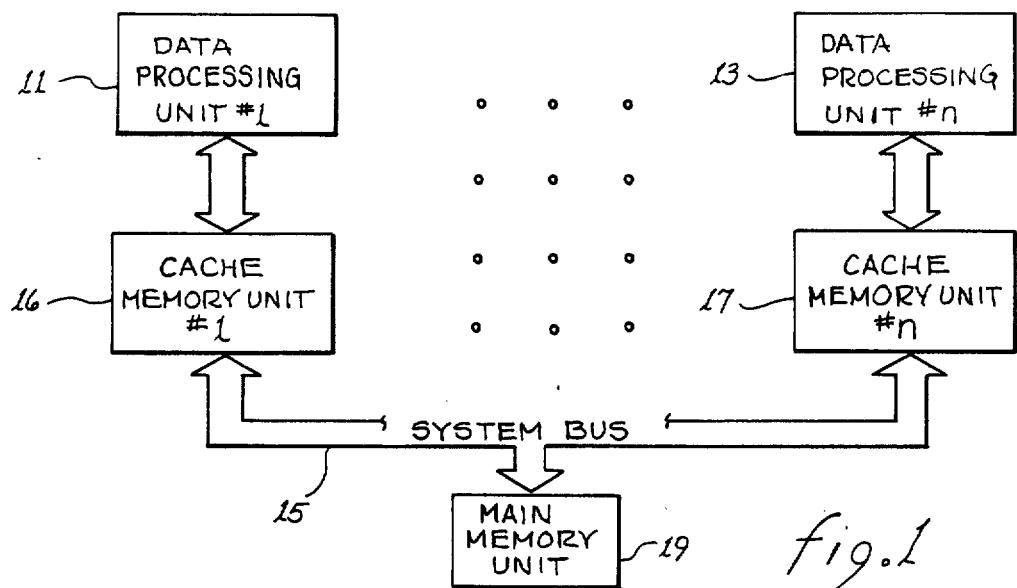
FIG. 1 is a block diagram of a data processing system having a system bus with a plurality of data processing units coupled thereto.

Referring to FIG. 1, a data processing system capable of using the instant invention is shown. A series of data processing units 11 through 13 are coupled to system bus 15. System bus 15 is also coupled to main memory unit 19. Associated with data processing unit #1 (11) is a cache memory unit #1 (16) and associated with data processing unit #n (13) is cache memory unit #n (17), i.e., all data processing units have a cache memory unit coupled thereto.

Figure 2B:
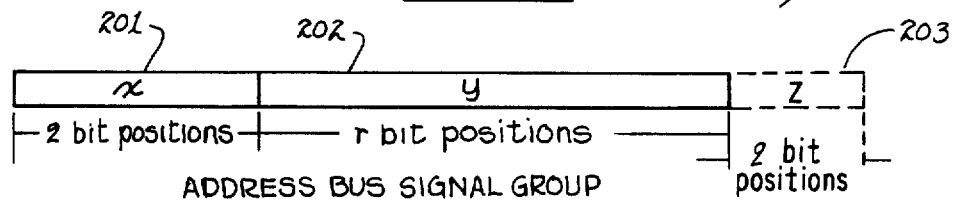
FIG. 2b is a representation of structure of the address signal group for use with a cache memory system.
Figure 2A:
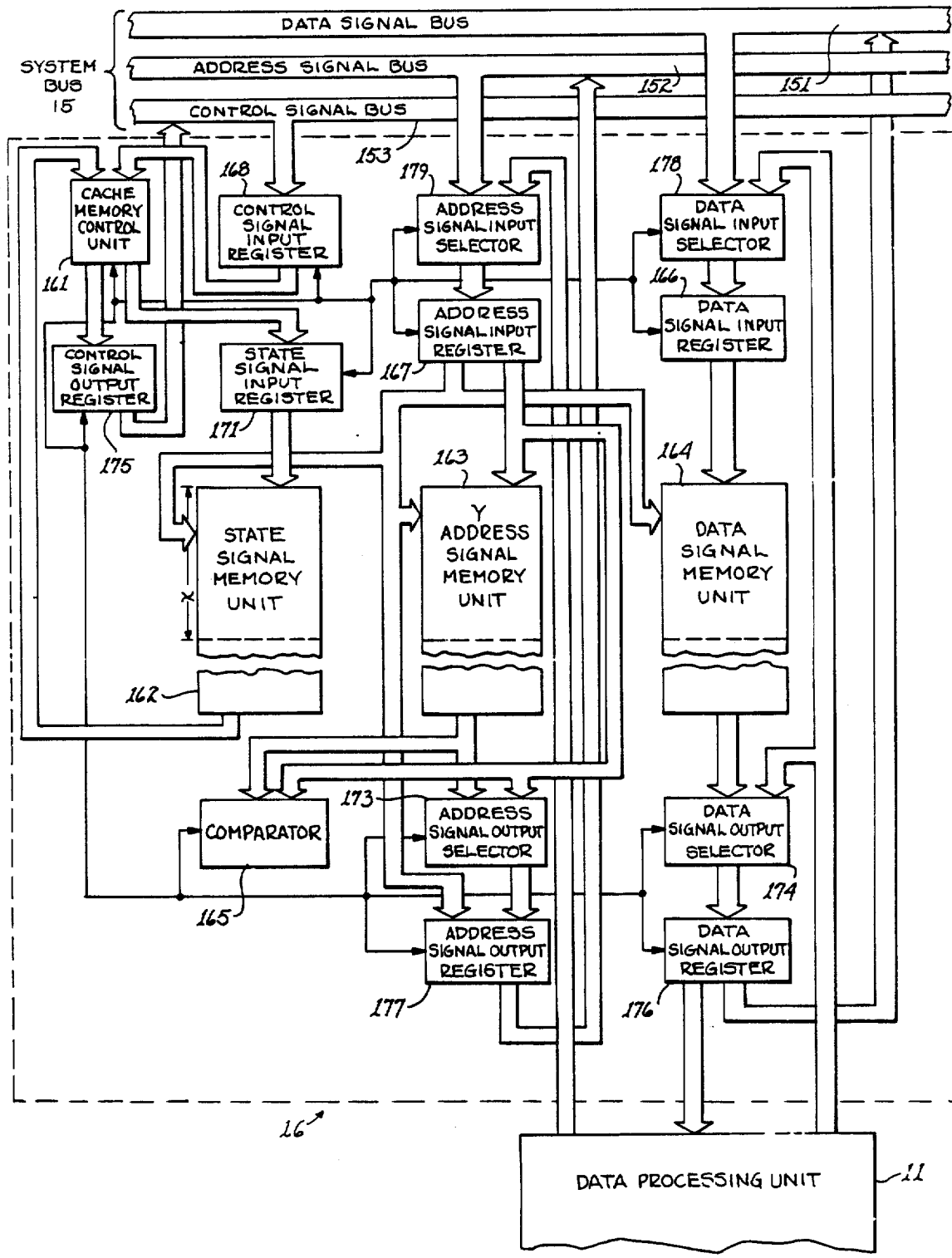
FIG. 2a is a schematic block diagram of a cache memory unit according to the present invention.

Referring to FIG. 2a, the schematic block diagram of a cache memory unit of the present invention, the system bus is shown as including three sub-buses, a data signal bus 151, an address signal bus 152 and a control signal bus 153. The cache memory unit 16 is coupled to the system bus 15 and to the data processing unit 11 as follows. Control signal input register 168 receives signals from control signal bus 153, and applies signals to cache memory control unit 161. Cache memory control unit 161 applies signals to control signal output register 175 and to state signal input register 171. State signal input register 171 applies signals to state signal memory unit 162. State signal memory unit 162 applies signals to cache memory control unit 161. Control signal output register 175 applies signals to control signal bus 153. Address signal input selector 179 receives signals from address signal bus 152 and from data processing unit 11 and applies signals to address signal input register 167. Address signal input register 167 applies signals to state signal memory unit 162, to y-address signal memory unit 163, to data signal memory unit 164, to address signal output selector 173, to comparator 165 and to address signal output register 177. Address signal output selector 173 and comparator 165 also receive signals from y-address signal memory unit 163. Address signal output register 177 also receives signals from address signal output selector 173 and applies signals to address signal bus 152. Data signal input selector 178 receives signals from data signal bus 151, and data processing unit 11. Data signal unit register 166 receives signals from data signal input selector 178 and applies signals to data signal memory unit 164. Data signal output selector 174 receives signals from data signal memory unit 164 and from data processing unit 11 and applies signals to data signal output register 176. Data signal output register 176 applies signals to data processing unit 11 and to data signal bus 151. The cache memory control unit 161 is coupled to data processing unit 11, to control signal output register 175, to control signal input register 168, to comparator 165, to address signal output selector 173, to address signal output register 177, to state signal input register 171, to address signal input selector 179, to address signal input register 167, to data signal input selector 178, to data signal input register 166, to data signal output selector 174 and to data signal output register 176.

Referring to FIG. 2b, the structure of the address signal groups is defined. For purposes of description of the present invention, the address data signal group is divided into three subgroups; an x-address signal group having q logic signal positions, a y-address signal group having r logic signal positions, and a z-address signal group having s logic signal positions. The x-address signal group defines a physical location of signal groups in the cache memory signal storage components. The y-address signal group is the portion of the address signal group stored in address signal group memory unit 163 at the x position when the data signal group corresponding to the address (x+y) is stored in the data signal group memory unit 164. The z group is an address signal group portion that is redundant when multiple basic data signal groups are transferred on the system bus simultaneously and identified by a single address signal group.

Figure 3:
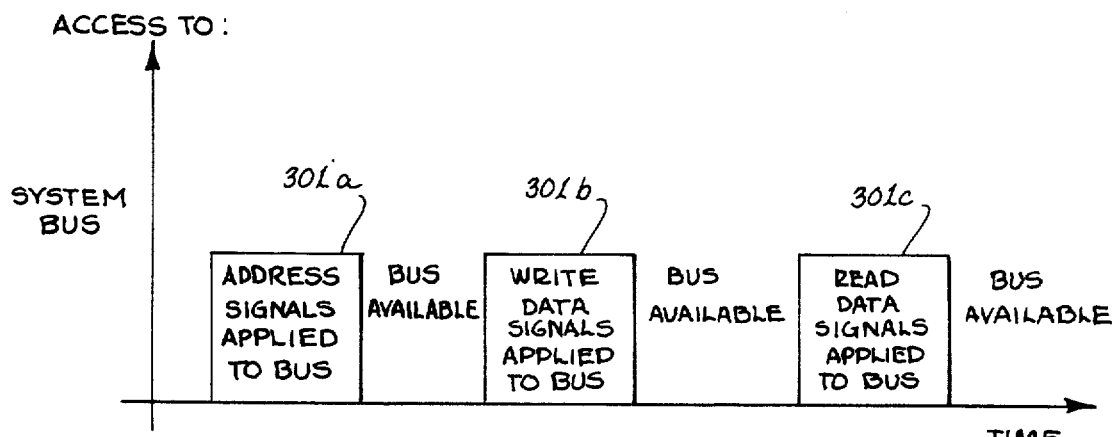
FIG. 3 is a block diagram illustrating the division of a typical operation involving the system bus into a plurality of sub-operations.

Referring to FIG. 3, a system bus access by a cache memory unit 16 is illustrated as being divided into three sub-operations or as being a "pipelined" operation. In the first portion of the operation, an address signal group is applied 301a to the address signal bus 152. After a period of time in which the system bus 15 is available for other use, a write data signals operation 301b is performed wherein a data signal group from the cache memory unit 16 is applied to data signal bus 151 of the system bus 15. The final sub-operation is the read data signals 301c, wherein the cache memory unit 16 receives signals from the data signal bus 151 for storage in the cache memory unit 16. If the period for the sub-operations are made sufficiently long, the three sub-operations can be performed consecutively and can provide a complete operation. However, the time of system bus access by the cache memory unit 16 will be relatively long and consequently provide inefficient system bus usage. By dividing the operation into three sub-operations and separating the sub-operations in time, the time for each sub-operation can be reduced and the total time used by the cache memory unit 16 for accessing the system bus 15 during one operation implemented by sub-operation is less than the total time required by the cache memory unit for each complete uninterrupted operation. The time that the bus 15 is available between the address signals being applied to the address signal bus 152 in sub-operation 301a and write data signals being applied to the data signal bus 151 in operation 301b can be different than the time that the bus 15 is available between the write data signals applied to the data signal bus 151 in operation 301b and the read data signals applied to data signal bus 151 in operation 301c.

Figure 4:
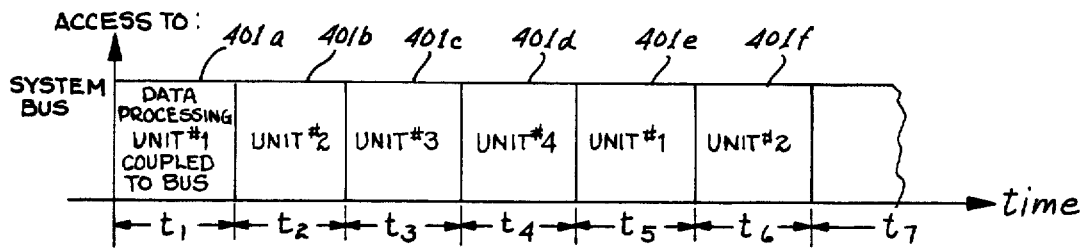
FIG. 4 is a block diagram illustrating the assignment of periodic time intervals for access by the data processing units to the system bus.

Referring to FIG. 4, an illustration of the use of the multiplexing of the access to a system bus 15 by a plurality of data processing units is shown. Data processing unit #1 has access 401a to the system bus 15 for a first time interval $t_1$. During the second time interval $t_2$, data processing unit #2 has access 401b to the system bus 15. Similarly, during period $t_3$, data processing unit #3 alone has access 401c to the system bus 15 and during period $t_4$, data processing unit #4 has access 401d to the system bus 15. In period $t_5$, data processing unit #1 again acquires access 401e to the system bus 15 and, in this manner, the cycle of the periodic access of the data processing units to the system bus 15 can be repeated.

Figure 5A:
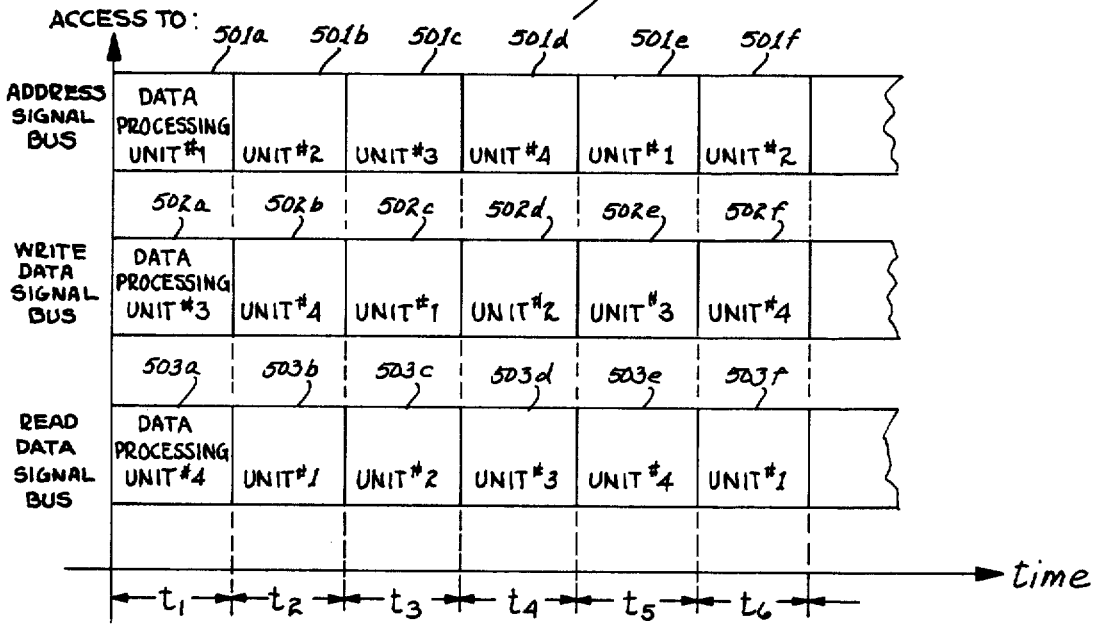
FIG. 5a is a block diagram illustrating the multiplexing and pipelining techniques applied to the system bus according to the present invention.

Referring to FIG. 5a, a schematic diagram of the assignment of time intervals for system bus access by four of data processing units is shown. In the illustrated scheme, the system bus is divided into a plurality of sub-buses, an address signal bus, a write data signal bus, and a read data signal bus. During period $t_1$, data processing unit #1 has access 501a to address signal bus, data processing unit #3 has access 502a to the write data signal bus and data processing unit #4 has access 503a to the read data signal bus. During time period $t_2$, data processing unit #2 has access 501b to the address signal bus, data processing unit #4 has access 502b to the write data signal bus and data processing unit #1 has access 503b to read data signal bus. During time period $t_3$, data processing unit #3 has access 501c to address signal bus, data processing unit #1 has access 502c to write data signal bus and data processing unit #2 has access 503c to read data signal bus. The progression for each succeeding period follows the data processing unit periodic access sequences thus established by these time periods.

Figure 5B:
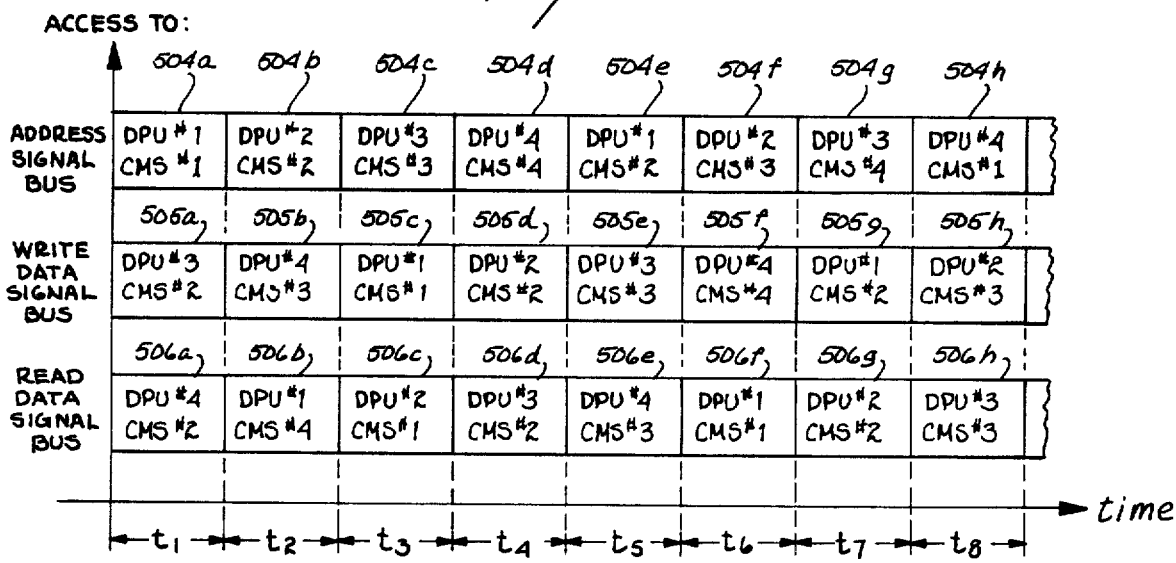
FIG. 5b is a block diagram illustrating the multiplexing and pipelining of the system bus when each cache memory unit has a plurality of cache memory sub-units associated therewith.

Referring to FIG. 5b, the periodic access of a plurality of cache memory units to a system bus, each cache memory unit having a plurality of cache memory sub-units is shown. The address signal bus, the write data signal bus and the read data signal bus are coupled to the cache memory units. In addition to indexing the system bus for periodic access by the cache memory units, the cache memory sub-units are also indexed in a similar manner. In the illustration of FIG. 5b, each cache memory unit is divided into four cache memory sub-units. The indexing of the system bus access periods occurs sequentially for each cache memory unit and sequentially for each cache memory sub-unit. For example, during interval $t_1$ the cache memory sub-unit #1 of data processing unit #1 accesses 504a on the address signal bus, while cache memory sub-system #2 of data processing unit #3 accesses 505a the write data processing signal bus and cache memory unit #2 of data processing unit m #2 of data processing unit # accesses 505a, the write data signal bus and cache memory unit #2 of data processing unit #4 accesses 506a the read signal bus. During interval $t_2$, the cache memory sub-unit #2 of data processing unit #2 accesses 504b, the address signal bus, while cache memory sub-unit #3 of data processing system #4 accesses 505b the write data bus and cache memory sub-unit #4 of data processing unit #1 accesses 506b, the read data signal bus. During interval $t_3$, cache memory sub-unit #3 of data processing system #3 accesses 504c the address signal bus, while cache memory subunit #1 of data processing unit #1 accesses 505c the write data signal bus and cache memory unit #1 of data processing unit #2 accesses 506c the read data signal bus. Referring next to interval $t_8$, cache memory sub-unit #1 of data processing unit

4 accesses 504h the address signal bus, while cache memory sub-unit #3 of data processing unit #2 accesses 505h the write data signal bus and cache memory sub-unit #3 of data processing unit #3 accesses 506h the read data signal bus. This procedure illustrates how a cyclic access can proceed in the cache memory sub-units.

It will be clear that, in the system bus accesses shown in FIG. 5a and FIG. 5b, a cache memory unit will be involved in only one access during an interval, i.e. two system bus sub-buses cannot be accessed during the same interval. However, subject to this constraint on simultaneous access to the system bus by cache memory units, no constraint need be placed on the cache memory sub-units of the cache memory unit.

Figure 6:
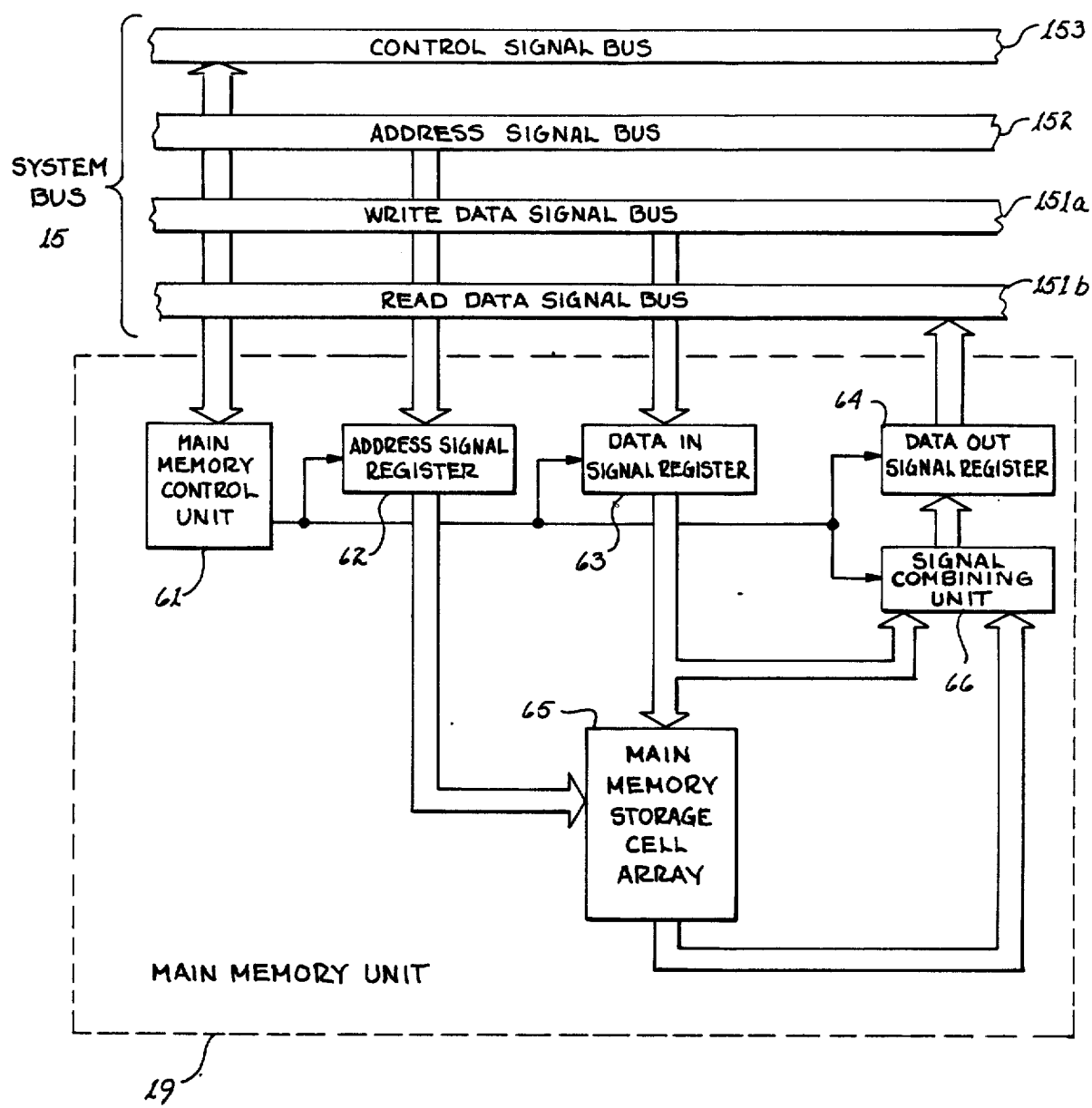
FIG. 6 is a schematic block diagram of the apparatus in the main memory unit supporting the "modify" data signal group operation.

Referring to FIG. 6, a block diagram of the main memory unit 19 is shown in accordance with the present invention. Main memory control unit 61 is coupled to address signal register 62, data in signal register 63, data out signal register 64, signal combining unit 66 and main memory storage cell array 65. Main memory control unit 61 receives control signals from the control signal bus 153 and, based on these signals, executes the manipulation of data signal groups stored in main memory storage cell array 65. Address signal register 62 can receive an address signal group from the address signal bus 152 and can apply signals to the main memory storage cell array 65 for activating a group of storage cells storing a binary data signal group at a location determined by the address signal group. Data in signal register 63 receives signals from the read data signal bus 153a and can apply these signals to main memory storage cell array 65, at a physical location determined by the contents of the address register 62, and to signal combining unit 66. Main memory storage cell array 65 can apply a data signal group at an address determined by the contents of address register 62 to signal combining unit 66. The contents of signal combining unit 66 are applied data out signal register 64 and, consequently, to the write data signal bus 153b.

Figure 7:
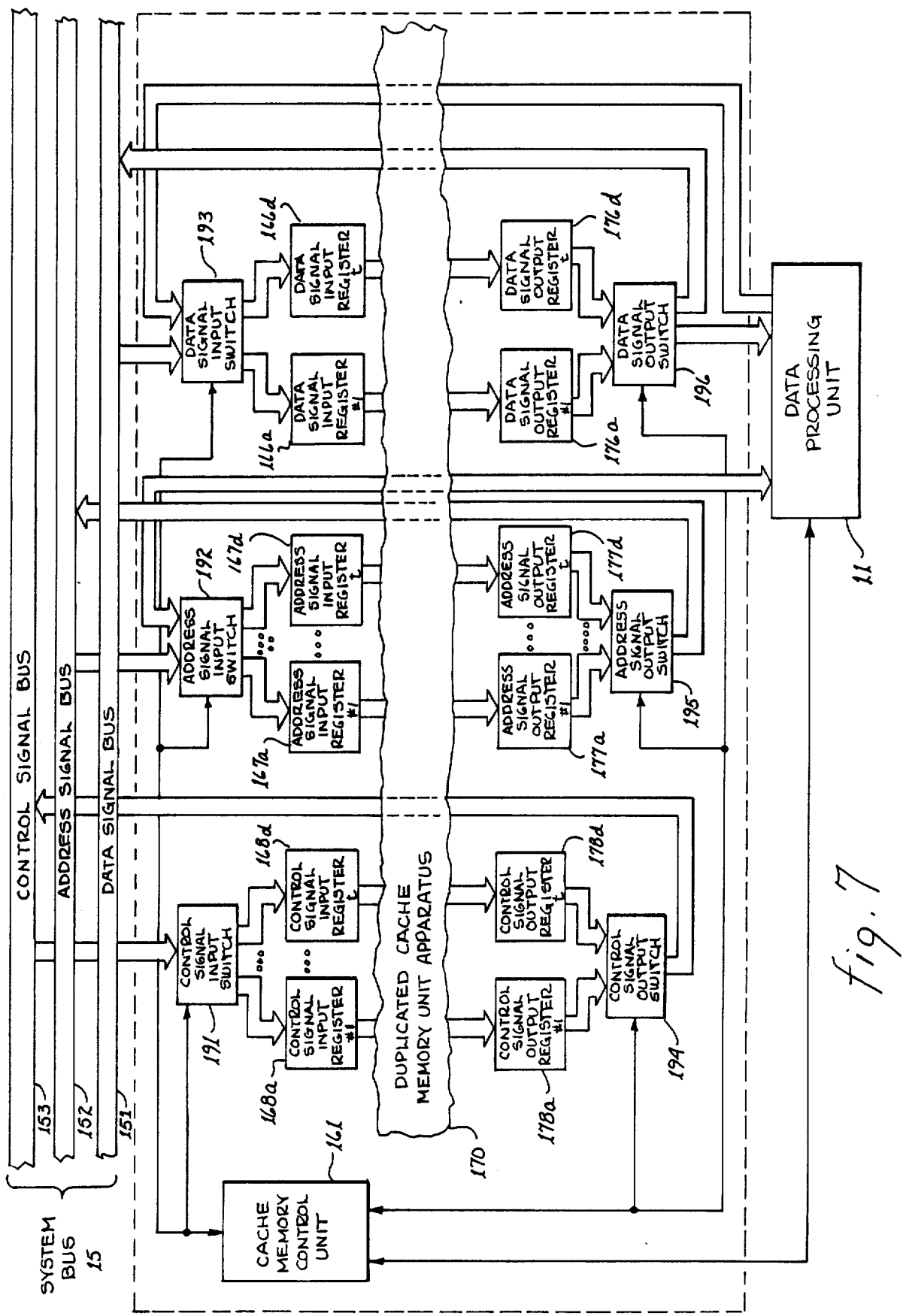
FIG. 7 is a schematic block diagram of the additional apparatus for cache memory unit to implement coupling a plurality of sub-memory units to each cache memory unit.

Referring to FIG. 7, the additional apparatus needed when the cache memory unit is divided into a plurality of cache memory sub-units shown. Control signal input register 168a through control signal input register 168d store signals received from control signal bus 153. However, the control signal bus 153 is coupled to the control signal input registers 168a-168d through a control signal input selector or switch 191. Similarly associated with each cache memory sub-unit are address signal input register 167a through address signal input register 167d. The address signals are received from address signal bus 152 and transferred through address signal input selector or switch 192. And the data signal bus is coupled to data signal input register 166a through data signal input register 166d through data signal input selector or switch 193. Control signal input switch 191, address signal input switch 192 and data signal input switch 193 are controlled by cache memory control unit 161 that determines, by the defined system bus access sequence, to which cache memory subunit the signals applied to the switches are directed. Similarly, the output register control signal 178a through control signal output register 178d are coupled to control signal output selector or switch 194. Under control of the cache memory control unit 161, the control signals, if any, are applied to the control signal bus 153 during an appropriate time interval. Similarly, the address signal output register 177a through address signal output register 177d are coupled through address signal output selector or switch 195 to the address signal bus 152. Data signal output selector or switch 196 controls the distribution of data signals from data signal output register 176a through data signal output register 176d to the data signal bus 151. The control signal output switch 194, the address signal output switch 195 and data signal output switch are controlled by cache memory control unit 161.

Figure 8:
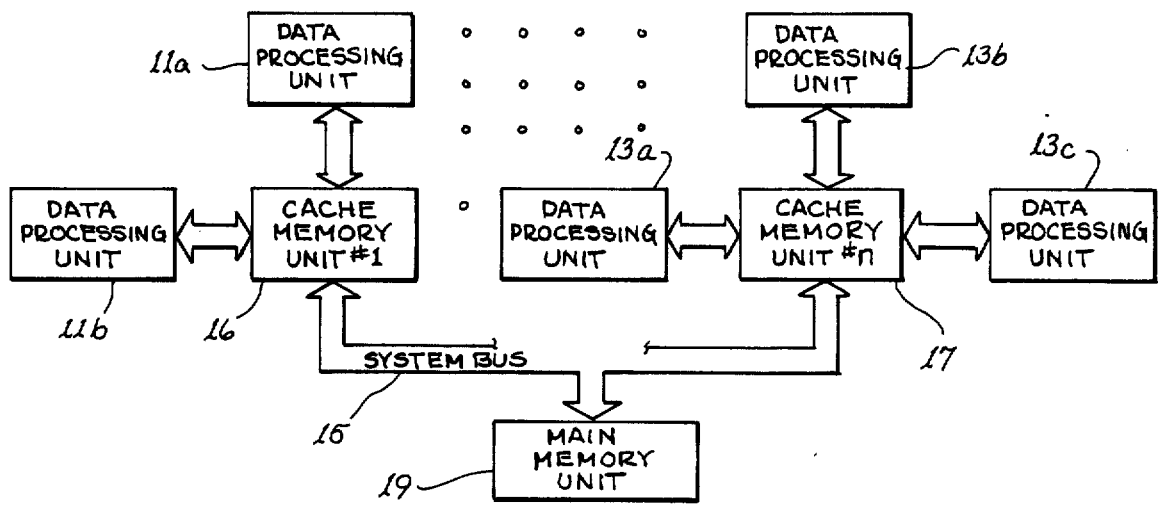
FIG. 8 is a schematic block diagram of a data processing system having a plurality of data processing units associated with each cache memory unit.

Referring next to FIG. 8, system bus 15 is coupled to a main memory unit 19 and to a plurality of cache memory units 16 through 17. Each cache memory unit is coupled to at least one data processing unit. For example, cache memory unit 16 is shown as coupled to data processing unit 11a, and to data processing unit 11b. Similarly, cache memory unit 17 is coupled to data processing unit 13a, data processing unit 13b and data processing unit 13c.

Figure 9:
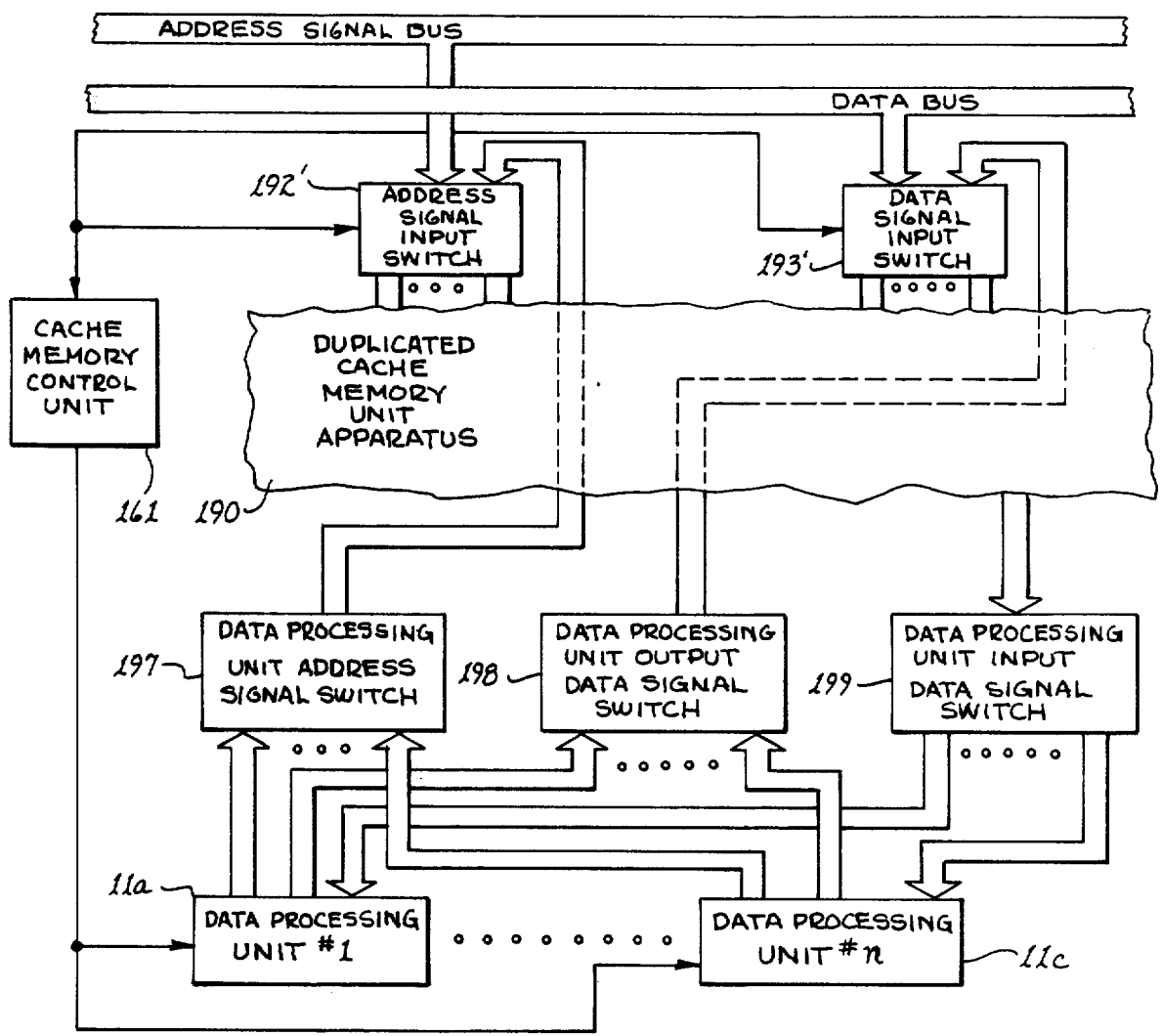
FIG. 9 is a schematic block diagram of the additional apparatus in each cache memory unit required to support the coupling to the cache memory unit of a plurality of data processing units.

Referring now to FIG. 9, the apparatus necessary for a cache memory unit to be coupled to a plurality of data processing units is shown. Data processing unit address signal selector or switch 197 receives address signals from data processing unit #1 (11a) through data processing unit (11c), and applies the address signals to address signal input selector or switch 192'. The address signal input selector or switch also receives address signals from the address signal bus (152). Data processing unit output data selector or switch 198 receives data signals from data processing unit #1 (11a) through data processing unit (11c) and applies the data signals to data signal input selector or switch 193'. The data signal input selector or switch also receives data signals from the data bus. Data processing unit input data signal selector or switch 199 receives data signals from the cache memory data signal group memory unit (i.e., in duplicated cache memory unit apparatus 190) and applies these data signals to data processing unit #1 (11a) through data processing unit #n (11c). Data processing unit #1 through data processing unit #n, data processing unit address signal switch 197, data processing unit output data signal switch 198 and data processing unit input data signal switch 199, address signal input switch 192' and data signal input switch 193' receive control signals from cache memory control unit 161.

Operation of the Preferred Embodiment

The present invention provides apparatus and method for a greatly enhanced transfer of data signal groups over the system bus. The increased performance of the system insures that the availability of data signal groups from the main memory does not provide a limitation on the system performance. To the contrary, the system bus, by means of the present invention, has become sufficiently efficient with respect to the transfer of information that the system bus was shown to be unused for unacceptable periods of time. It was therefore found possible to vary the structure of the data processing system from one where a cache memory unit was associated with each data processing unit to an structure where a cache memory unit was able to provide temporary storage of data signal groups for a plurality of data processing systems. The system bus is coupled, in addition to the main memory, to a plurality of cache memory units, and each of the cache memory units, in turn, can be coupled to a plurality of data processing units.

Referring once again to FIG. 1, it will be understood that the cache memory units, shown as separate entities, can be implemented as part of the associated data processing unit. The cache memory unit is a signal storage unit for storing signal groups that have been requested by the data processing unit or have a relatively high probability of being requested by the data processing unit, e.g. by being in one of two paths of a program decision tree. The availability of signal groups is also enhanced by use of the transfer of multiple data signal groups during a signal operation, i.e. data processing system software programs are typically written with successive instructions in successive storage locations. These data signal groups are more readily available to the associated data processing unit than are the data signal groups stored in the main memory. In the present invention, the cache memory unit can be of the type generally referred to as a "write-back" or "write-thru" cache memory unit. This type of cache memory unit is distinguished by the mode of operation in which the result of every associated data processing unit operation is returned to the cache memory unit.

The cache memory unit illustrated in FIG. 2a, and FIG 2b has another feature common to cache memory units. The address is divided into three parts. The first part (labeled x in FIG. 2b) defines a physical location in the memory components of the cache memory unit. When an address signal group is stored in address signal input register 167 and applied to the three cache memory subunits, a location is enabled in the y-address signal group register and the signal group at the location defined by the x-signal group will be applied to the comparator. The y-address signal group from the memory location can be compared with the y-address signal group of address signal input register 167. If these address signal groups are the same, the result is communicated to the cache control unit 161. The least significant signal bits are typically omitted when the data bus can transfer a plurality of basic data signal groups. For example, if the data signal groups are comprised of signal groups usually referred to as words, and the data signal groups are always transferred in groups of two words, the final data bit can be omitted in the address (for purposes relevant to the instant invention). Similarly, if four words of data signal groups are identified by a single address, the final two address signal bits can be omitted. The operation of the cache memory unit is thus complicated by the use of the two subgroups of the address signal group. To determine if a data signal group is stored in the cache memory units, it is first necessary to determine if the associated address signal group is stored in the cache memory unit. An address signal group is therefore entered in address signal input register 167. The x-portion of the address signal group is applied to the addressing mechanism of y-address signal group memory unit 163. The contents of the location in y-address group memory unit 163 are applied to comparator 165 along with the y-address portion of the address signal group in address signal input register 167. If the two y-address signals groups are identical, then the associated data signal group is stored in data signal group memory unit 164. The apparatus of cache memory unit 16 is adapted so that when the data signal group is not stored in the cache memory unit 16, then, by means of the cache memory control unit 161, the address signals are applied to the address signal bus, at the appropriate time, through the address signal output selector or switch 173.

In order to provide for an appropriate division of a bus access operation into a plurality of sub-operations, these sub-operations must be able to accommodate the most time-consuming operation. In the present data processing system, this operation is the operation in which a data signal group requested by a data processing unit must first be modified by a data signal group from the requesting data processing unit. For example, the data signal group transferred over the system bus can be comprised of a plurality of sub-data signal groups, e.g. words. The data processing unit can be arranged to manipulate the data signal subgroups and can wish to store a resulting data signal subgroup in a memory location not currently stored in the cache memory unit 16. The data signal subgroup must then be sent to the main memory unit 19, replace the data signal subgroup in a data signal group of the main memory unit 19 and place the resulting data signal group on the system bus 15 for storage in the cache memory unit. The main memory unit 19 of FIG. 6 is arranged to expedite the process by combining the input data signal group with the data signal group of the main memory unit address in the signal combining unit 66 without first storing the input data signal group in the main memory unit 19. With this apparatus available in the main memory, the "modify" main memory address operation is expedited. The most complex system bus access can be decomposed into an address operation, a write (to main memory unit) operation and a read (from the main memory unit) operation. To increase the efficiency of the system bus activity further; each operation is provided with dedicated system sub-buses to perform the data transfer of the operation. In order to accommodate subsystem delays, each sub-operation of an operation can be separated from the other sub-operations as shown in FIG. 3 and FIG. 5a.

To improve effectiveness of the system bus, the access to the system bus can be multiplexed, i.e. each data processing unit has a defined periodic access to the system bus as shown in FIG. 4. It has been found that further efficiencies in data signal group transfer can be accomplished by dividing the cache memory unit into a plurality of cache memory subunits, each cache memory subunit storing data signal groups related to a predefined portion of access signal group space. In the preferred embodiment, the cache memory unit 16 is divided into four cache memory sub-units. Each cache memory sub-unit is identified with an address bit, providing a further simplification with respect to addressing. A further advantage of the use of the plurality of cache memory sub-units can be increased availability of the cache memory unit when a plurality of data processing units are coupled thereto. The combination of the sub-operations, the sub-bus implementation, the multiplexing mode of operation and the division of the cache memory unit 16 into a plurality of cache memory sub-units on the system bus access is shown in FIG. 5b. Timing signals defining time intervals for each cache memory unit 16 can be transferred to the cache memory control unit 161 by the control signal bus 153.

Referring to FIG. 8, the techniques for improving the system bus untilization provide that, instead of each data processing unit having a cache memory unit associated therewith, the cache memory unit can have a plurality of data processing units associated therewith. This structure provides increased data processing system efficiency.

With the use of a plurality of cache memory sub-units and with the coupling to each cache memory unit 16 of a plurality of data processing units, the switching mechanism, shown symbolically in FIG. 7 and FIG. 9, must be provided to direct signal groups to the appropriate destination. It will be clear that the implementation of such switches can take several forms. For example, a signal group can be applied to a plurality of input registers, but an appropriate strobe signal will store (or latch) the signal group only in the appropriate register. In other instances, the timing of the application of a signal group to an output register can determine the signal group destination. Thus, the switching or data-directing procedures can be a matter of design choice.

It will be clear that the use of dedicated time intervals for each bus access (i.e. by a cache memory unit) provides a convenient logical frame work for use of the system bus. With this technique, some time intervals can go unused depending on activity associated with the cache memory unit. It will be clear that, at the cost of increased logic apparatus, a bus arbiter can be used to control access to the system bus. The bus arbiter will maintain the same constraints as the dedicated access procedure, e.g. a cache memory unit cannot access the system bus (or even different portions of the system bus) during consecutive time intervals. However, the bus arbiter can provide additional refinements, such as priority procedures, at the expense of increased logic and communication apparatus. The bus arbiter can be a portion of the cache memory control unit 161 or can be a separate apparatus supplying signals to said cache memory control unit 161.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In a data processing system including a system bus, a method for transferring signal groups on said system bus and stored in a main memory unit to and from a plurality of cache memory units, each of said cache memory units coupled to at least one processing unit, said method comprising the steps of:
   permitting access to said system bus by said main memory unit and by said cache memory units during a sequence of time intervals having a predetermined duration;
   dividing each of said system bus signal group transfer operations into a plurality of system bus transfer sub-operations, each sub-operation performed during a one of said time intervals, each sub-operation performed on preselected portions of said system bus, wherein a first of said preselected portions of said system bus is dedicated to data signal groups transferred from said cache memory units, a second of said preselected portions of said system bus being dedicated to data signal groups transferred from said main memory unit, a third of said preselected portions of said system bus being dedicated to address signal groups, said address signal groups defining a one of said data signal groups, each interval of said plurality of sub-operation intervals of a transfer of a signal group having a first preselected relationship with respect to other intervals of said plurality of sub-operation intervals, wherein sub-operation intervals for two transfers of signal groups can be interleaved, said dividing step including the steps of:
   dividing each system bus access operations into sub-operations having the steps of:
   applying an address signal group to said system bus;
   applying a data signal group from a selected cache memory unit to said system bus to said system bus; and
   applying a data signal group from said main memory unit to said system bus;
   executing said system bus transfer sub-operations by a first cache memory unit and a second cache memory unit, wherein transfer sub-operation intervals of said first cache memory unit and transfer sub-operation intervals of said second cache memory unit have a predetermined temporal relationship; and
   combining said cache memory unit data signal group with said main memory unit data signal group in accordance with control signals from said selected cache memory unit, said first preselected relationship providing sufficient time between sub-operations to permit said combining step.

2. The system bus signal group transfer method of claim 1 further including the step of coupling a plurality of data processing units to a one of said cache memory units.

3. The system bus signal group transfer method of claim 2 further including the step of dividing each cache memory unit into a plurality of cache memory sub-units, each of said cache memory sub-units independently exchanging signal groups with data processing units coupled to said cache memory unit, each cache memory sub-unit operating independently of other cache memory sub-units of said cache memory unit, wherein sub-operation intervals for transfer of signal groups with said system bus for each of said cache memory sub-units have a second preselected relationship.

4. A data processing system comprising:
   a system bus for distributing groups of logic signals throughout said data processing system, said system bus including a plurality of sub-bus units, each of said sub-bus units carrying groups of logic signals related to a preselected sub-operation implementing said distributing groups of logic signals, wherein each access to said system bus occurs during a sequence of intervals having a preselected duration, each sub-operation occurring during a one of said intervals, said sub-operation intervals of each distributing of logic signal groups occurring during system bus intervals having a preestablished relationship, wherein two distributing of logic signal operations can have interleaved sub-operations;
   a main memory unit coupled to said system bus for storing a plurality of groups of logic signals, each group of logic signal identified by an address signal group, wherein said system bus includes a first sub-bus unit for transferring groups of logic signals received from said main memory unit, said main memory unit including apparatus for combining data signal groups from a second sub-bus unit and said main memory unit and applying a modified data signal group to said first sub-bus means unit in response to selected control signals, said sub-operation preestablished relationship selected to permit said combining data between a memory write sub-operation and a memory read sub-operation;
   a plurality of cache memory units coupled to said system bus for storing a subset of said main memory unit groups of logic signals, said plurality of sub-bus units including an address sub-bus unit for applying address signal groups to and receiving address signal groups from said cache memory units; and a data processing unit coupled to each of said cache memory units, said data processing unit processing groups of logic stored in said main memory unit.

5. The data processing system of claim 4 wherein a one of said cache memory units is divided into a plurality of cache memory sub-units, each cache memory sub-unit being coupled to said system bus, each cache memory sub-unit having a periodic sub-sequence of intervals assigned thereto for transfer of logic signal groups with said system bus, each of said sub-sequence of intervals having a determined relationship with sub-sequence of intervals associated with other cache memory sub-units.

6. The data processing unit of claim 4 wherein access to said system bus by said cache memory units is determined by a system bus arbiter means.

7. The data processing system of claim 4 wherein a one of said cache memory units is coupled to a plurality of said data processing units.

8. The data processing system of claim 7 wherein each of said cache memory units includes a plurality of sub-cache memory units, each of said sub-cache memory units being coupled to a one of said coupled data processing units.

* * * * *